United States Patent
Rossin et al.

(10) Patent No.: US 10,584,015 B2
(45) Date of Patent: Mar. 10, 2020

(54) PIPELINE ASSEMBLY LINE AND METHOD FOR SUPPORTING AN APPARATUS DESIGNED TO COUPLE TO A PIPELINE

(71) Applicant: SAIPEM S.p.A., San Donato Milanese (IT)

(72) Inventors: Davide Rossin, San Donato Milanese (IT); Lorenzo Penati, San Donato Milanese (IT); Fabrizio Gazzarri, Rosignano Marittimo (IT)

(73) Assignee: SAIPEM S.P.A., San Donato Milanese (IT)

( * ) Notice: Subject to any disclaimer, the term of this patent is extended or adjusted under 35 U.S.C. 154(b) by 236 days.

(21) Appl. No.: 15/526,910

(22) PCT Filed: Nov. 17, 2015

(86) PCT No.: PCT/IB2015/058898
§ 371 (c)(1),
(2) Date: May 15, 2017

(87) PCT Pub. No.: WO2016/079679
PCT Pub. Date: May 26, 2016

(65) Prior Publication Data
US 2017/0349411 A1 Dec. 7, 2017

(30) Foreign Application Priority Data
Nov. 17, 2014 (IT) .......................... MI2014A001980

(51) Int. Cl.
*F16L 1/16* (2006.01)
*F16L 1/23* (2006.01)
(Continued)

(52) U.S. Cl.
CPC .............. *B66C 1/66* (2013.01); *B63B 35/03* (2013.01); *F16L 1/161* (2013.01); *F16L 1/235* (2013.01); *F16M 13/022* (2013.01)

(58) Field of Classification Search
CPC ......... B66C 1/66; F16M 13/022; F16L 1/235; F16L 1/161; B63B 35/03
See application file for complete search history.

(56) References Cited

U.S. PATENT DOCUMENTS 1,748,500 A * 2/1930 Thaden ...................... B64F 1/14
244/115
2,537,829 A * 1/1951 Hohler ....................... B66C 1/66
294/82.32
(Continued)

FOREIGN PATENT DOCUMENTS

| DE | 10333938 | 11/2004 |
|---|---|---|
| WO | WO 2011/152785 | 12/2011 |
| WO | WO 2012/140631 | 10/2012 |

OTHER PUBLICATIONS

Notification Concerning Submission, Obtention or Transmittal of Priority Document for International Application No. PCT/IB2015/058898 dated Feb. 17, 2016.
(Continued)

*Primary Examiner* — Benjamin F Fiorello
*Assistant Examiner* — Edwin J Toledo-Duran
(74) *Attorney, Agent, or Firm* — Neal, Gerber & Eisenberg LLP (57) ABSTRACT

A connecting device for supporting an apparatus configured to couple to a pipeline and having a coupling mechanism, which has a first portion configured to couple integrally to the apparatus, and a second portion, configured to be connected to a hoisting device, and selectively releasable from the first portion in a designated or given direction as a
(Continued)

function of the relative position of, and the force exchanged between, the apparatus and the hoisting device.

25 Claims, 6 Drawing Sheets

(51) Int. Cl.
| | |
|---|---|
| *F16L 13/02* | (2006.01) |
| *B66C 1/66* | (2006.01) |
| *B63B 35/03* | (2006.01) |
| *F16L 1/235* | (2006.01) |
| *F16M 13/02* | (2006.01) |

(56) References Cited

U.S. PATENT DOCUMENTS

| | | | | |
|---|---|---|---|---|
| 2,986,750 A * | 6/1961 | Herreshoff | B63B 23/58 | 114/368 |
| 3,056,267 A * | 10/1962 | McRee | E02D 9/005 | 405/191 |
| 3,445,133 A * | 5/1969 | Reischl | B66C 1/66 | 294/82.1 |
| 3,744,070 A * | 7/1973 | Shaw | B60P 3/1033 | 114/344 |
| 4,108,485 A * | 8/1978 | Jennings | B66C 1/66 | 294/67.31 |
| 4,573,725 A * | 3/1986 | Griffiths | B66C 1/66 | 24/603 |
| 4,664,434 A * | 5/1987 | Borst | B66C 23/36 | 294/87.1 |
| 4,724,970 A * | 2/1988 | Kuhn | B66C 13/02 | 212/272 |
| 5,593,050 A * | 1/1997 | Lange | B66C 19/00 | 212/325 |
| 5,642,960 A | 7/1997 | Salice | | |
| 5,707,168 A * | 1/1998 | Sharon | B66C 1/62 | 403/362 |
| 5,943,977 A * | 8/1999 | Womack | B63B 35/816 | 114/242 |
| 6,068,066 A * | 5/2000 | Byrt | E21B 15/02 | 173/152 |
| 6,227,751 B1 * | 5/2001 | Kemmer | E06B 3/5436 | 403/143 |
| 6,347,424 B1 * | 2/2002 | Vatne | B63B 27/14 | 14/69.5 |
| 7,107,925 B2 * | 9/2006 | Wille | B63B 22/026 | 114/230.15 |
| 7,226,233 B2 * | 6/2007 | Subenbach | F16B 21/186 | 403/122 |
| 9,926,048 B2 * | 3/2018 | Ruivenkamp | B63B 23/58 | |
| 2005/0076484 A1 | 4/2005 | Sussenbach et al. | | |
| 2007/0222244 A1 * | 9/2007 | Cornwell | B66C 1/62 | 294/90 |
| 2011/0170988 A1 * | 7/2011 | Perry | B63B 27/30 | 414/138.2 |
| 2015/0336775 A1 * | 11/2015 | Ruivenkamp | B63B 23/58 | 405/3 |

OTHER PUBLICATIONS

International Search Report and Written Opinion for International Application No. PCT/IB2015/058898 dated Mar. 1, 2016.
PCT Demand for International Preliminary Examination and Reply to International Search Report and the associated Written Opinion for International Application No. PCT/IB2015/058898 dated Sep. 2, 2016.
Notification of Receipt of Demand by Competent International Preliminary Examining Authority (Form PCT/IPEA/402) for International Application No. PCT/IB2015/058898 dated Sep. 9, 2016.
Second Written Opinion of the International Preliminary Examining Authority for International Application No. PCT/IB2015/058898 dated Oct. 6, 2016.
Reply to the Second Written Opinion of the International Searching Authority for International Application No. PCT/IB2015/058898 dated Dec. 6, 2016.
Notification of Transmittal of the International Preliminary Report on Patentability (Form PCT/IPEA/416) for International Application No. International Application No. PCT/IB2015/058898 dated Feb. 10, 2017.

\* cited by examiner

PIPELINE ASSEMBLY LINE AND METHOD FOR SUPPORTING AN APPARATUS DESIGNED TO COUPLE TO A PIPELINE

PRIORITY CLAIM

This application is a national stage application of PCT/IB2015/058898, filed on Nov. 17, 2015, which claims the benefit of and priority to Italian Patent Application No. MI2014A001980, filed on Nov. 17, 2014, the entire contents of which are each incorporated by reference herein.

BACKGROUND

The field of constructing pipelines formed by lengths of pipe in an assembly line comprises a plurality of workstations. In general, the assembly line is arranged on board a laying vessel that launches and lays the pipeline on a bed of a body of water. Each workstation along the assembly line comprises at least one apparatus that is cyclically coupled to the pipeline. Basically, each apparatus is supported by a hoisting device so that apparatus can placed on the pipeline and coupled to the latter, and is decoupled from the pipeline once the apparatus has finished the operations on the pipeline. Since the pipeline is partially immersed in the body of water, the pipeline is inevitably subject to relative movements with respect to the laying vessel. In consequence, the coupling between the work apparatus and the pipeline prevents relative movements between the apparatus and the pipeline and enables the apparatus to perform precision operations on the pipeline. In order to speed up operations along the assembly line, the hoisting device is also connected to the work apparatus when the work apparatus is coupled to the pipeline, so as to be ready to support the apparatus once the work cycle is finished. The hoisting device comprises a flexible elongated member, such as a rope, cable or chain, which is connected to the work apparatus. In the step where the work apparatus is coupled to the pipeline, the flexible elongated member is left slack to allow the apparatus to move together with the pipeline with respect to the laying vessel without stressing the hoisting device.

In the specific field of pipeline laying, the pipeline is progressively released as the pipeline is assembled. The advancement of the pipeline is controlled by braking devices that progressively release the pipeline according to the work cycles of the assembly line as disclosed in PCT Patent Application No. WO 2012/140631. Basically, the braking devices grip the pipeline with tracks or clamps, and alternate steps of locking the pipeline with steps of controlled advancement or release of the pipeline. The natural descent or advancement of the pipeline with respect to the laying vessel is caused by the slope and/or forward movement of the laying vessel. In exceptional situations, especially when the weather and sea conditions are particularly critical, friction could be lost between the braking devices and the pipeline, with consequent loss of control over the pipeline. An event of this type is very rare because the safety systems on board the laying vessel are redundant, as is the sizing of the braking devices. Nevertheless, the loss of the pipeline would be a particularly destructive event if the work apparatuses are coupled to the pipeline because the work apparatuses could drag the respective hoisting devices with them, which are in turn constrained to a load-bearing structure of the assembly line.

Therefore, the potential consequences of losing the pipeline would not just possibly produce disastrous effects on the material structures on board the laying vessel, but, due to the above-described domino effect, could place the safety of the crew at potential risk.

SUMMARY

The present disclosure relates to a pipeline assembly line configured to minimize certain of the problems caused by the loss of the pipeline or, more in general, by excessive movements of the pipeline along its axis and, in particular, to reduce the risks for the crew without impairing the productivity of the assembly line.

In accordance with the present disclosure a pipeline assembly line is provided, the assembly line comprising an apparatus configured to selectively couple to the pipeline and perform a specific operation on the pipeline; a hoisting device configured to selectively support the apparatus; and a connecting device configured to connect the apparatus to the hoisting device, and to support the apparatus, the connecting device comprising a coupling mechanism having a first portion configured to couple integrally to the apparatus; a second portion configured to be connected to the hoisting device and selectively releasable from the first portion in a designated or given direction as a function of the relative position of, and the force exchanged between, the apparatus and the hoisting device; and a safety lock between the first and second portions that is selectively activated on the basis of the relative position of, and the force exchanged between, the apparatus and the hoisting device in a direction crosswise to the designated direction. In this way, it is possible to prevent a domino effect triggered by loss of control of the pipeline. In particular, the relative position between the apparatus and the hoisting device determines the direction of application of the force.

The relative position and the force exchanged between the first and second portions can cause engagement of the safety lock, which prevents the first and second portions from uncoupling. In this way, the relative position and the force exchanged between the apparatus and the hoisting device distinguish the operating modes of the connecting device.

In particular, the designated direction is substantially horizontal. In S-laying operations, the pipeline on the laying vessel is substantially horizontal or slightly inclined with respect to the horizontal. In consequence, disengagement from the connecting device takes place in the designated horizontal direction.

In accordance with the present disclosure, the first portion is in the form of a guide, and the second portion is in the form of a carriage and is releasable from the first portion solely by movements in the designated direction.

It should be appreciated that the first and second portions are coupled together via a positive connection to prevent movements in any direction other than the designated direction.

In certain embodiments, the first portion comprises rollways extending in the designated direction; and the second portion comprises rollers configured to roll along the rollways. In this way, relative sliding between the first and second portions in the designated direction is facilitated.

In accordance with the present disclosure, the first and second portions are configured to define a click-on coupling preventing relative movement between the first and second portions in the designated direction.

The click-on connection can be released when the component of force in the designated direction exceeds a threshold value. The component of force in the designated direction depends on the relative position between the apparatus and the hoisting device.

From a constructional standpoint, the first and second portions respectively comprise a pocket and a further roller configured to be mutually and elastically engageable to form said click-on coupling. In this way, it is possible to create a reversible click-on connection in a relatively simple and relatively inexpensive manner.

In accordance with the present disclosure, the first portion comprises a spring configured to push the pocket towards the second portion; the preload of the spring being, in certain embodiments, selectively adjustable; and the first and second portions being released when the component, parallel to the designated direction, of the force exchanged between the first and second portions exceeds a threshold value determined by the preload on the spring. In this way, it is possible to adjust, in a relatively simple manner, the threshold value beyond which the first and second portions uncouple.

In accordance with the present disclosure, the first portion comprises a groove extending in the designated direction; the pocket being located along the groove; and the further roller being movable along the groove and configured to be housed partly inside the pocket. In this way, the further roller is able to interfere with the pocket to define the reversible click-on connection.

In particular, the control of the relative position between the apparatus and the hoisting device is completely mechanical. In the case in point, the second portion comprises at least a first and a second eyelet movable selectively with respect to each other, crosswise to the designated direction, and which are configured to be engaged simultaneously by a hook or by a strap of the hoisting device; the first and second eyelets being configured so that movement of the hook or the strap in a substantially vertical direction raises the second eyelet with respect to the first eyelet and engages the safety lock.

The same mechanism enables excluding engagement of the safety lock. In fact, the first and second eyelets have, respectively, a first and a second overlappable opening; wherein the first opening merges with a central seat and two lateral seats, which are located above the first opening and each configured to house the hook or strap; the lateral seats being located on opposite sides of the central seat and sloping with respect to the central seat, so that, when the hook or strap engages the central seat, the second eyelet is raised with respect to the first eyelet and the safety lock is engaged, and, when the hook or strap engages one of the lateral seats, the second eyelet is not raised sufficiently with respect to the first eyelet to engage the safety lock.

From a practical viewpoint, the first and second portions respectively comprise at least one recess and a projection, which mutually engage to form the safety lock, which stops any possible relative movement between the first and second portions in the designated direction.

From the constructional standpoint, the second portion comprises a frame, and a slide with at least one projection, the slide being movable with respect to the frame, being connected to the frame by at least one elastic member to keep the projection detached from the recess, and being liftable by the hoisting device to engage the projection inside the recess.

It should be appreciated that the force necessary to engage the safety lock is that able to overcome the force of the elastic member arranged between the frame and the slide.

In accordance with the present disclosure, the second portion comprises a holder configured to house a flexible elongated member of the hoisting device when the flexible elongated member is left slack.

The possibility of leaving the flexible elongated member slack enables relative movements between the apparatus and the hoisting device without transmitting forces between the hoisting device and the apparatus. Furthermore, the holder prevents the flexible elongated member from interfering with parts of the connecting device and/or of the apparatus.

In accordance with the present disclosure, the connecting device comprises a structure configured to connect integrally to the apparatus; the structure being configured to enable the coupling mechanism to be mounted in a quantity or number of positions with the structure tilted at different angles with respect to the coupling mechanism, and to keep the designated direction substantially horizontal, regardless of the tilt angle of the pipeline and the apparatus. In this way, the release force between the first and second portions is not affected by weight forces.

The connecting device, a subject of the present disclosure, finds particular application in each workstation of the pipeline assembly line and, in particular, in an assembly line on board a laying vessel.

A further advantage of the present disclosure is to provide a method suitable for supporting an apparatus configured to be coupled to a pipeline and reducing certain of the drawbacks of certain of the known art.

In accordance with the present disclosure, a method is provided for supporting an apparatus configured to couple to a pipeline and perform a specific operation on the pipeline, the method comprising the steps of connecting the apparatus to a hoisting device via a connecting device having a coupling mechanism, which comprises a first portion configured to connect integrally to the apparatus, and a second portion configured to connect to the hoisting device; selectively releasing the second portion from the first portion in a designated or given direction as a function of the relative position of, and the force exchanged between, the apparatus and the hoisting device; and and selectively engaging a safety lock between the first and second portions to prevent relative movements in the designated direction, regardless of the force exchanged between the first and second portions; the safety lock being engaged as a function of the relative position of, and the force exchanged between, the apparatus and the hoisting device in a direction crosswise to the designated direction. In this way, when the component parallel to the given direction of the force exchanged between the apparatus coupled to the pipeline and the hoisting device exceeds a threshold value, the connecting device consequently releases the apparatus and the pipeline from the hoisting device. The entity of the component of force along the designated direction depends on the relative position between the apparatus and the hoisting device.

Additional features and advantages are described in, and will be apparent from the following Detailed Description and the figures.

BRIEF DESCRIPTION OF THE DRAWINGS

Further characteristics and advantages of the present disclosure will become clear from the description below of an embodiment, with reference to the figures in the accompanying drawings, in which.

DETAILED DESCRIPTION

Figure 1:
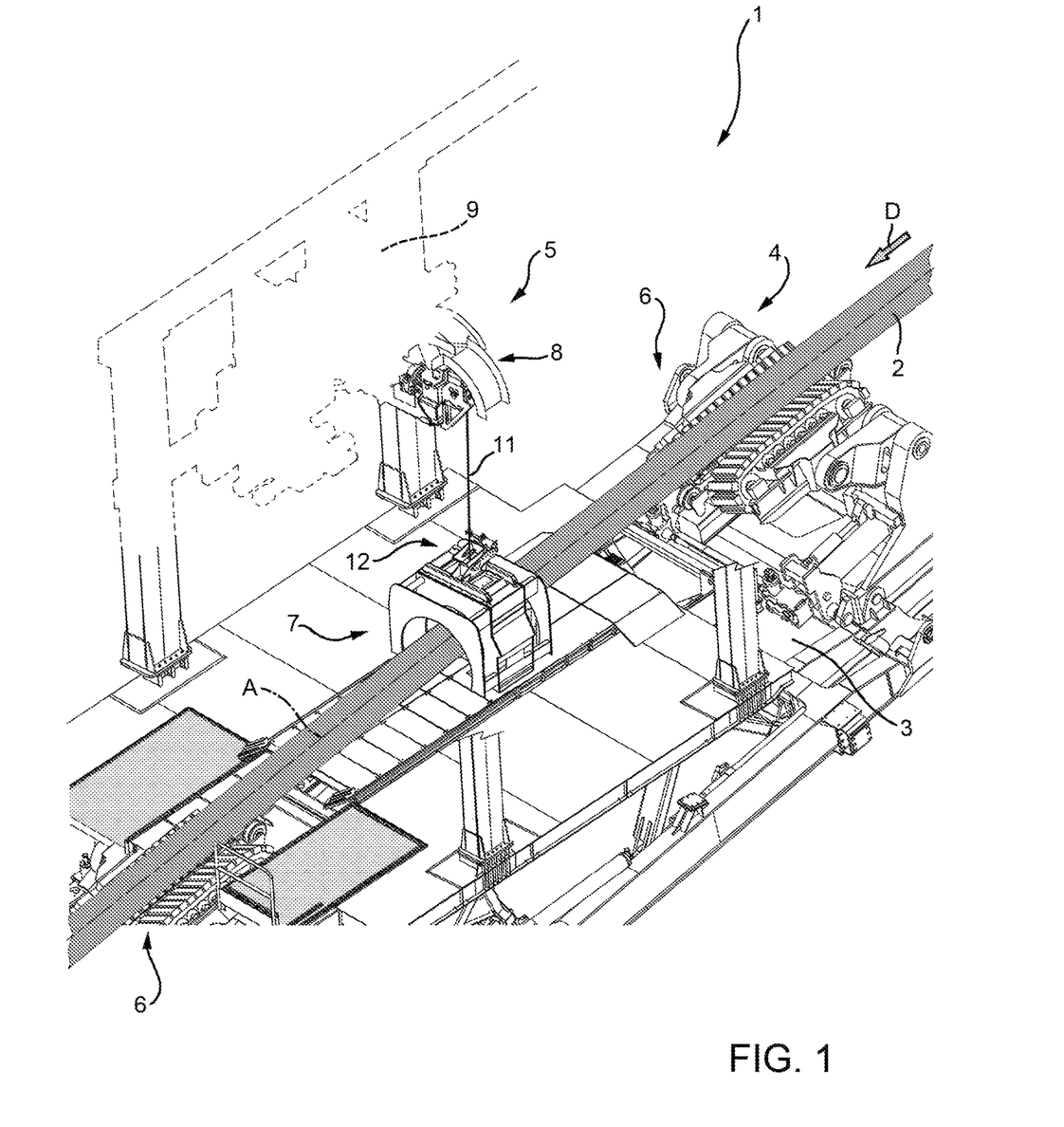
FIG. 1 is a perspective view, with parts removed for clarity, of an underwater pipeline laying vessel.

Referring now to the example embodiments of the present disclosure illustrated in FIGS. 1 to 9, referring to FIG. 1, reference numeral 1 indicates, as a whole, a laying vessel configured to lay a pipeline 2 on a bed of a body of water (not shown in the accompanying figures). The laying vessel 1 comprises a deck 3; and an assembly line 4 that extends along the deck 3 and comprises workstations 5 arranged in sequence (only one of which is shown in FIG. 1), and support cradles 6 assigned to controlling the release of the pipeline 2. The workstations 5 are assigned to joining lengths of pipe of predetermined length (not shown in the accompanying figures) or performing operations associated with the joint, such as field joint coating.

Each workstation 5 comprises an associated apparatus 7 configured to selectively couple to the pipeline 2 and perform a specific operation on the pipeline 2; and a hoisting device 8 connected to the apparatus 7 to support the apparatus 7 when the apparatus 7 is uncoupled from the pipeline 2. The hoisting device 8 is mounted on a support frame 9.

The pipeline 2 extends along an axis A and is advanced in a feed direction D.

Figure 2:
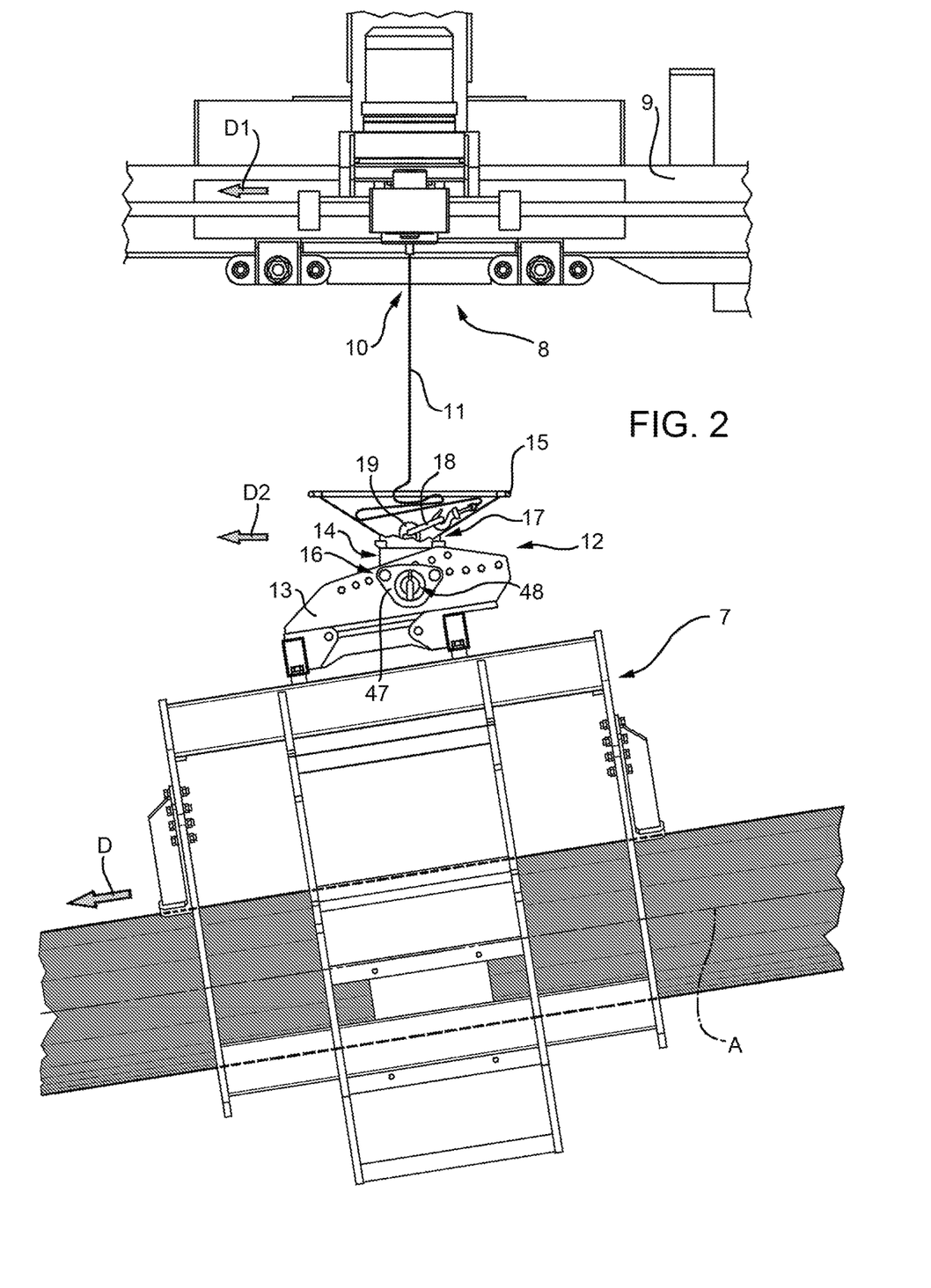
FIG. 2 is a side elevation view, with parts removed for clarity and on an enlarged scale, of a detail of a workstation of the laying vessel in FIG. 1.

Referring to FIG. 2, the hoisting device 8 comprises a winch 10, which comprises a flexible elongated member 11, such as a rope, cable or chain, connected to the apparatus 7 by a connecting device 12. The winch 10 is selectively movable in a direction D1 along the support structure 9 for a predetermined distance. The connecting device 12 comprises a structure 13 configured to couple integrally to the apparatus 7; a coupling mechanism 14 mounted on the structure 13; and a holder 15 mounted above the coupling mechanism 14 and configured to house a length of excess flexible elongated member 11.

Figure 3:
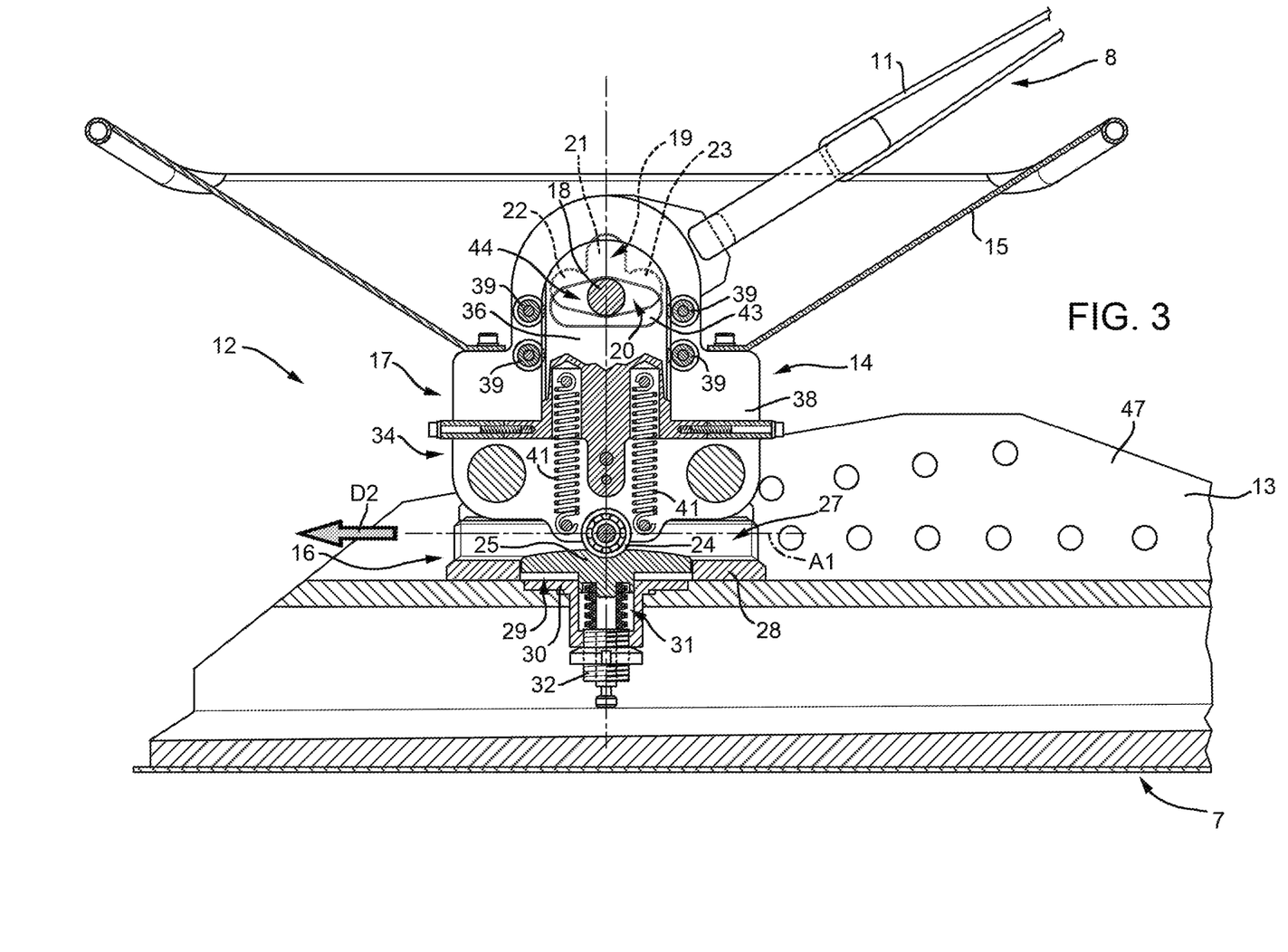
FIG. 3 is a sectional view, with parts removed for clarity and on a further enlarged scale, of a connecting device used in the workstation in FIG. 2 and a subject of the present disclosure.

Referring to FIG. 3, the coupling mechanism 14 comprises a portion 16 integrally mounted on the structure 13; and a portion 17 connected to the flexible elongated member 11 and which can be coupled to portion 16.

Portions 16 and 17 can be coupled to and uncoupled from each other via relative movement of portions 16 and 17 in a designated or given direction D2. The uncoupling of portions 16 and 17 depends on the relative position and the force exchanged between the apparatus 7 and the hoisting device 8 (FIG. 2). In other words, if the flexible elongated member 11 is not perfectly vertical, the force exchanged between the apparatus 7 and the hoisting device has a component parallel to the designated direction D2 which causes the uncoupling of portions 16 and 17 when the force exceeds a certain threshold value. The above-stated relative position and force exchanged between the apparatus 7 and the hoisting device 8 can cause the uncoupling of portions 16 and 17 or the engagement of a safety lock between portions 16 and 17 that prevents detachment. Automatic engagement of the safety lock takes place when the flexible elongated member 11 is taut and arranged in a substantially vertical position so as to apply an upward tensile force on portion 17. The flexible elongated member 11 thus has the job of transmitting the forces between the apparatus 7 and the hoisting device 8 and indicating the relative position between the apparatus 7 and the hoisting device 8. It should be appreciated that the hoisting device 8 occupies a position that is substantially fixed or movable in direction D1 within a relatively limited range (FIG. 2), while the apparatus 7, when coupled to the pipeline 2, is capable of performing movements in the feed direction D of the pipeline 2 that, in the event of loss of control of the pipeline 2, could be particularly significant.

The flexible elongated member 11 is coupled to portion 17 by a hook 18 or a strap inserted in an eyelet 19, which has an opening 20 and three seats 21, 22 and 23 that merge into opening 20, radially running from the centre of the opening 20 and extending above the opening 20. Seat 21 extends centrally and vertically, while seats 22 and 23 extend on opposite sides with respect to seat 21 in directions each forming an angle greater than 45° with respect to the vertical. It should be appreciated that the value of these angles can be modified according to the specific application, based on the layout of the workstation, the type of apparatus and the maximum permissible movements.

When the flexible elongated member 11 extends along the vertical and is taut (FIG. 2), the hook 18 naturally occupies seat 21 and portion 17 is firmly locked to portion 16.

When the flexible elongated member 11 is taut and extends along a direction significantly inclined with respect to the vertical, as shown in FIG. 3, the hook 18 engages one of the two seats 22 and 23 (seat 23 in the case shown) and when the force exchanged between portions 16 and 17 exceeds a threshold value, portion 17 becomes uncoupled from portion 16.

Portion 16 is in the form of a guide extending along an axis A1, while portion 17 is in the form of a carriage and is capable of moving along portion 16 in direction D2, parallel to axis A1.

Portion 16 and portion 17 are configured to be coupled together to prevent relative sliding between portions 16 and 17 in direction D2. Effectively, the coupling of portions 16 and 17 provides a click-on connection that, in the case shown, is implemented as a positive connection between a roller 24 and a pocket 25. The pocket 25 is mounted on portion 16, while the roller 24 is mounted on portion 17; naturally, an assembly inverted with respect to that shown would achieve the same goal. The pocket 25 is mounted on portion 16 in an elastically pliable manner so as to enable adjustment of the degree of interference with the roller 24 and the degree of pliability.

Figure 4:
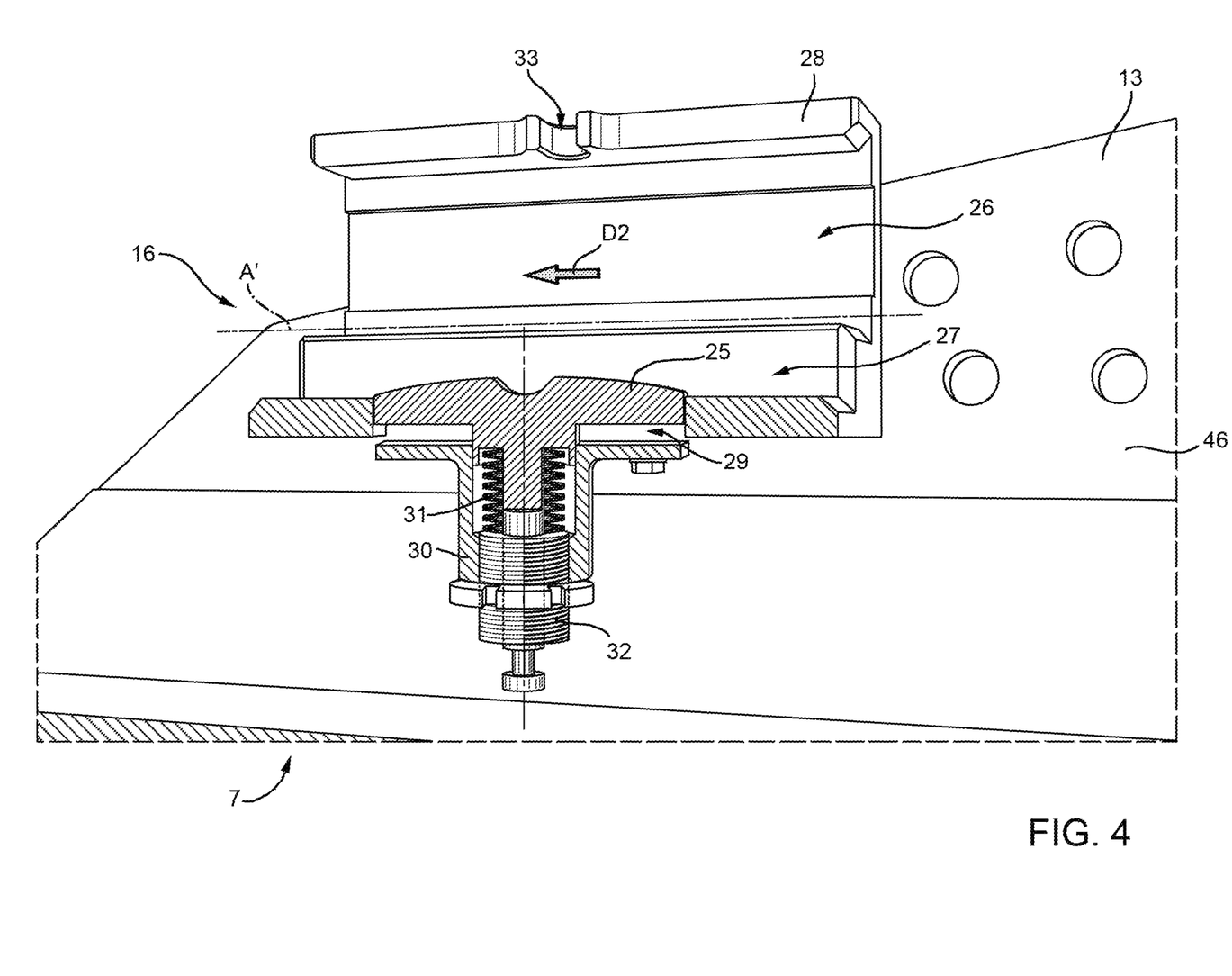
FIG. 4 is a perspective view, on a further enlarged scale and with parts removed for clarity and parts in section, of a component of the connecting device in FIG. 3.

Referring to FIG. 4, portion 16 comprises two rollways 26 extending in direction D2 (only one of which is shown in FIG. 4) and a groove 27, parallel to the rollways 26 and along which the pocket 25 is arranged. From the constructional standpoint, portion 16 is made of an opportunely modeled structural shape 28, or by a plurality of structural shapes rigidly joined together, to define the rollways 26 and the groove 27. The structural shape 28 has a seat 29 along the groove 27 to house the pocket 25. In the case in point, portion 16 comprises a support 30 fastened to the structural shape 28 and in which the pocket 25 is partly housed in a sliding manner; a spring 31, in the case in point, a plurality of Belleville springs mounted opposite to each other; and a ring nut 32 to adjust the precompression or preload of the spring 31.

In the case shown, the structural shape 28 has two recesses 33 (only one of which is shown in FIG. 4) crosswise to axis A1.

Figure 5:
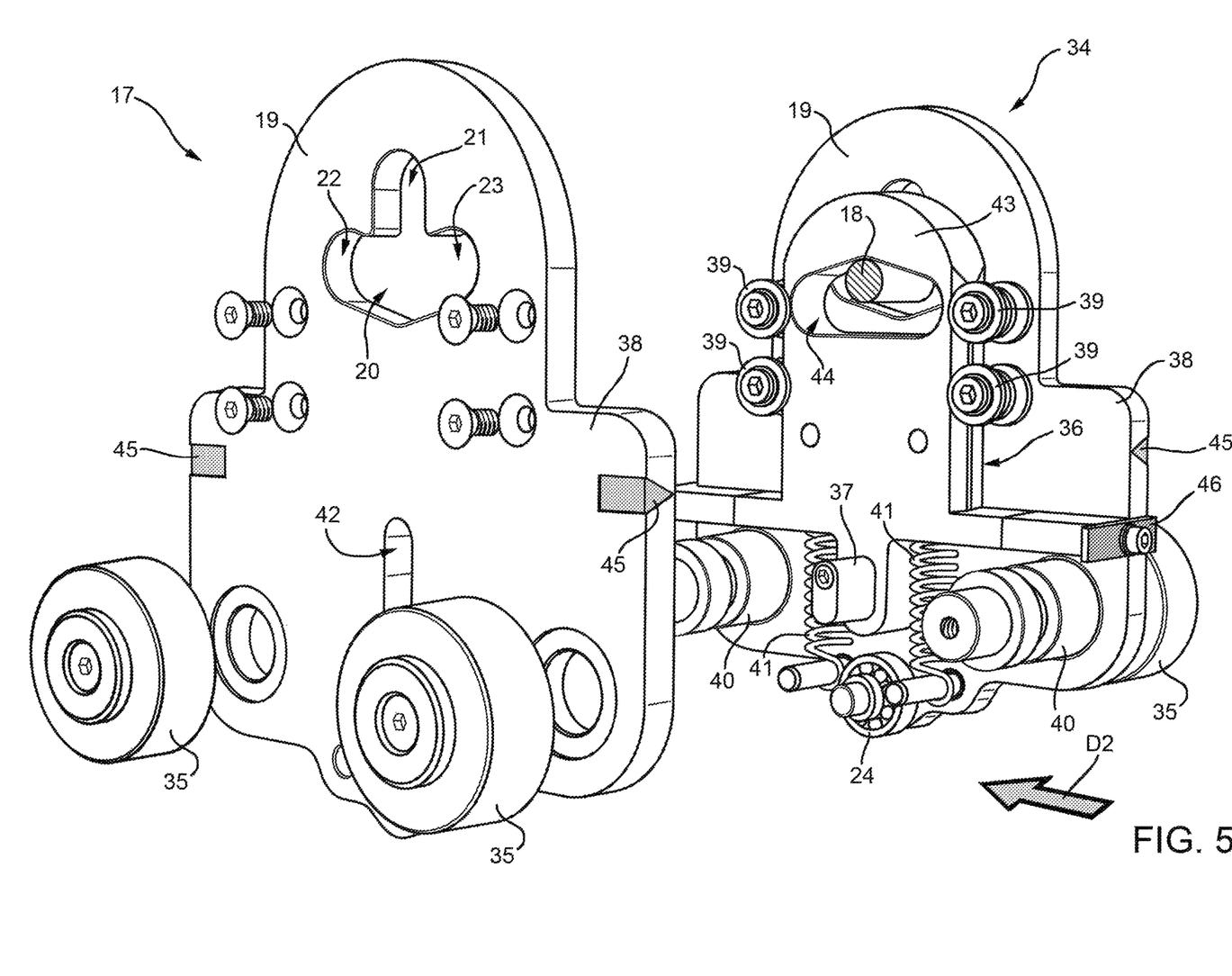
FIG. 5 is a partially exploded perspective view, on a further enlarged scale and with parts removed for clarity, of another component of the connecting device in FIG. 3.
Figures 6, 7, 8, 9:
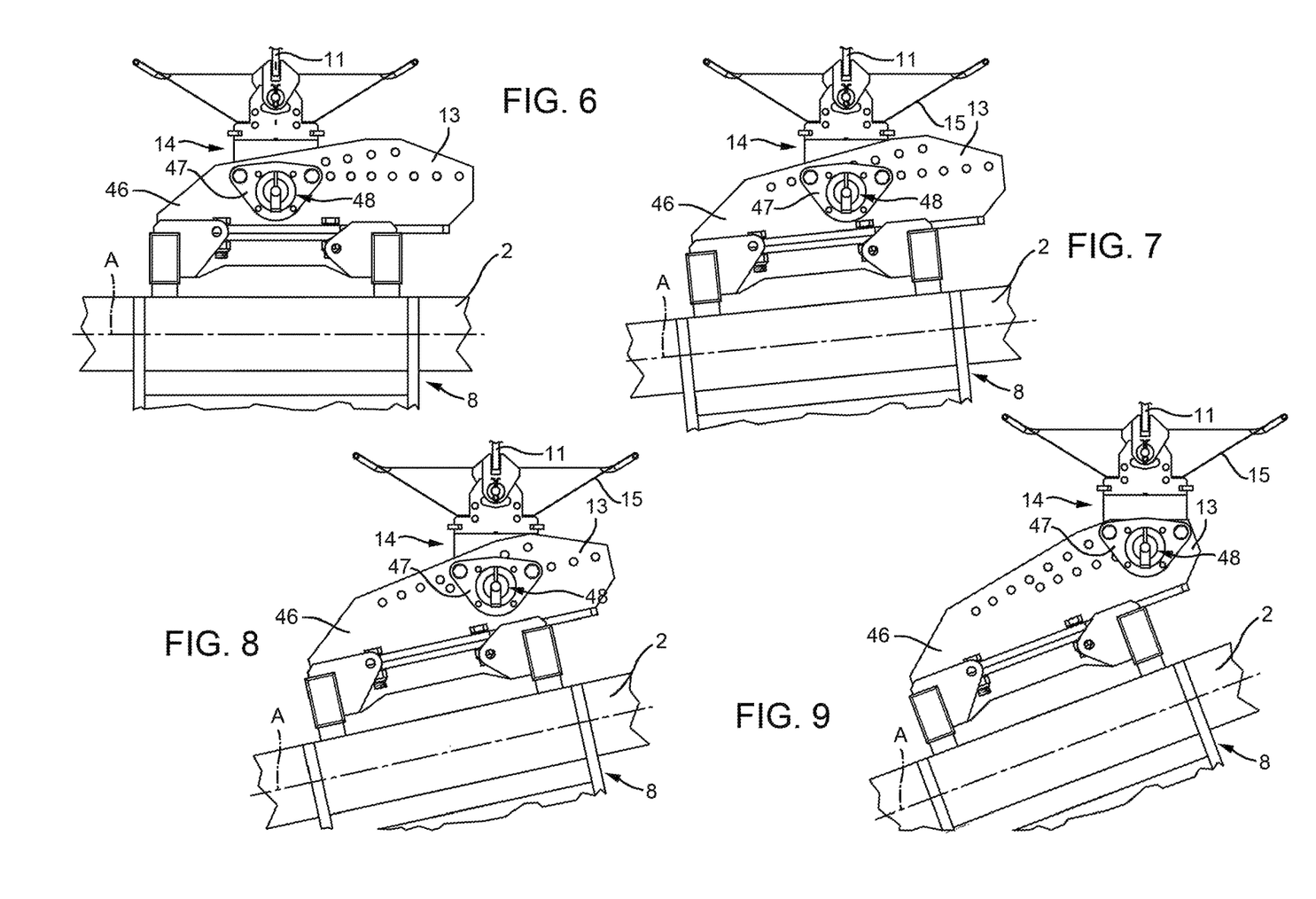
FIGS. 6 to 9 are side elevation views, with parts removed for clarity and on a smaller scale, of the connecting device.

Referring to FIG. 5, portion 17 is, as said, in the form of a carriage and comprises a frame 34, four rollers 35 supported in rotation by the frame 34 and configured to roll along the rollways 26 (only one of which is shown in FIG. 4); the roller 24 configured to cooperate with the pocket 25 (FIG. 4) and run along the groove 27 (FIG. 4); a slide 36 selectively movable in a direction crosswise to direction D2; and two projections 37, which are mounted on the slide 36 and configured to engage respective recesses 33 (only one of which is shown in FIG. 4) so as to halt relative sliding between portions 16 and 17.

When engaged in the recesses 33, the projections 37 prevent relative movements between portions 16 and 17 in direction D2 regardless of the force exchanged between portions 16 and 17 in direction D2 and define a safety lock intended to prevent accidental disengagement between portions 16 and 17 when the apparatus is supported by the hoisting device 8. The hoisting device 8 is able to engage the safety lock when the flexible elongated member 11 is stretched in a substantially vertical direction.

In greater detail, the frame 34 comprises two plates 38 facing each other and spaced apart by spacers 39 and 40 to define a space between the two plates 38. The rollers 35 are arranged on the outside of the frame 34, while roller 24 and the slide 36 are arranged inside the space between the two plates 38. The slide 36 is elastically held in the lowered position shown in FIG. 5. In the case shown, portion 17 comprises two springs 41, the opposite ends of which are anchored to the frame 34 and to the slide 36.

Each plate 38 also comprises a slot 42 parallel to the direction of operation of the slide 36 and configured to house a projection 37.

Each plate 38 has the previously described eyelet 19 provided with the main opening 20 and three secondary openings 21, 22, and 23.

The slide 36 comprises a respective eyelet 43 defining a respective opening 44, the lowered position of which is partially overlapped by openings 20.

The eyelets 19 and 43 are configured to be engaged by the hook 18 that, when hook engages the seat 21, causes the slide 36 to slide upwards with respect to the frame 34 until the projections 37 engage in the recesses 33 (FIG. 4) and thus effect automatic engagement of the safety lock.

The frame 34 and the slide 36 also have respective references 45 and 46 that, when they are mutually aligned, indicate that the slide 36 (FIG. 5) is raised and portion 17 is locked with respect to portion 16 (FIG. 4) and the safety lock has been correctly engaged.

FIGS. 6 to 9 show several mounting configurations of the coupling mechanism 14 with the structure 13. In this embodiment, the structure 13 has at least one plate 46 provided with a plurality of holes evenly distributed along the plate 46 and configured to enable the mounting of the coupling mechanism 14 via bolted joints and two backing plates 47 (only one of which is shown in the accompanying figures). The plurality of holes enables mounting the coupling mechanism 14 tilted at different angles with respect to the structure 13. The different mounting configurations enable keeping the axis A1 of the coupling mechanism 14 in a substantially horizontal position regardless of the inclination of the longitudinal axis A the pipeline 2 in that defined point of the assembly line 4.

Each backing plate 47 is fitted with an indicator 48, which provides information on the tilt angle of the backing plate 47 and the coupling mechanism 14.

In use, and referring to FIG. 2, in a step where advancement of the pipeline 2 in feed direction D is halted, the apparatus 7 is coupled to the pipeline 2 to perform an operation on the pipeline 2. In this step, the flexible elongated member 11 is left slack to the extent that the excess thereof is collected in the holder 15. The excess portion of flexible elongated member 11 enables relative movements between the pipeline 2 and the apparatus 7 on one hand, and the winch 10 and the support frame 9 on the other, without a substantial exchange of strain between the apparatus 7 and the hoisting device 8.

The entity of the relative movements without the transmission of strain depends on the length of the excess flexible elongated member 11.

Once the operation on the pipeline 2 has been performed, the apparatus 7 is uncoupled from the pipeline 2 and is supported by the hoisting device 8, and possibly raised. In this case, the flexible elongated member 11 is taut and is arranged in a substantially vertical direction so as to lift the slide 36 and engage the safety lock between portions 16 and 17.

In the event of losing control of the pipeline 2, the pipeline 2 advances in an uncontrolled manner in the feed direction D together with the apparatus 7. In this case, the flexible elongated member 11 assumes the configuration shown in FIG. 3. Basically, the hook 18 is guided to enter seat 23 of the eyelets 19. In this way, the safety lock between portions 16 and 17 is not engaged and, if the component parallel to direction D2 of the force transmitted along the flexible elongated member 11 exceeds a certain threshold value, the roller 24 leaves the pocket 25, pushing the pocket 25 downwards. Once the roller 24 has disengaged from the pocket 25, portion 17 is free to slide with respect to portion 16 in direction D2.

Finally, it is evident that variants can be made to the present disclosure with respect to the embodiments described with reference to the accompanying drawings without departing from the scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A pipeline assembly line comprising:
   an apparatus configured to selectively couple to a pipeline;
   a hoisting device configured to selectively support the apparatus; and
   a connecting device configured to connect the apparatus to the hoisting device, wherein the connecting device includes a coupling mechanism including:
   a first portion configured to be coupled to the apparatus;
   a second portion comprising at least a first eyelet and a second eyelet selectively movable, crosswise to a designated direction, with respect to each other, the second portion configured to be connected to the hoisting device, wherein the first eyelet and second eyelet are simultaneously engaged by a component of the hoisting device, and said second portion is selectively releasable from the first portion in the designated direction based on: (i) relative positions of the apparatus and the hoisting device, and (ii) a first force exchanged between the apparatus and the hoisting device; and a safety lock between the first portion and the second portion, said safety lock being selectively activated based on: (i) the relative positions of the apparatus and the hoisting device, and (ii) a second force exchanged between the apparatus and the hoisting device in a direction crosswise to the designated direction, wherein the first eyelet and the second eyelet of the second portion are configured so that movement of the component of the hoisting device in a substantially vertical direction raises the second eyelet with respect to the first eyelet and engages the safety lock.

2. The pipeline assembly line of claim 1, wherein the designated direction is substantially horizontal.

3. The pipeline assembly line of claim 1, wherein the first portion comprises a guide and the second portion comprises a carriage releasable from the first portion based on movement in the designated direction.

4. The pipeline assembly line of claim 1, wherein the first portion comprises a rollway extending in the designated direction and the second portion comprises a roller configured to roll along the rollway.

5. The pipeline assembly line of claim 1, wherein the first portion and the second portion are configured to define a click-on coupling preventing relative movement between the first portion and the second portion in the designated direction.

6. The pipeline assembly line of claim 5, wherein the first portion defines a pocket and the second portion comprises a roller mutually and elastically engageable with the pocket to form said click-on coupling.

7. The pipeline assembly line of claim 6, wherein the first portion comprises a spring configured to push the pocket defined by the first portion towards the second portion, and the first portion and the second portion are each released when a component, parallel to the designated direction, of the first force exchanged between the apparatus and the hoisting device exceeds a threshold value determined by a preload of the spring.

8. The pipeline assembly line of claim 7, wherein the preload of the spring is selectively adjustable.

9. The pipeline assembly line of claim 6, wherein:
the first portion defines a groove extending in the designated direction,
the pocket is located along the groove, and
a roller is movable along the groove and configured to be housed partly inside the pocket.

10. The pipeline assembly line of claim 1, wherein the component of the hoisting device is selected from the group consisting of: a hook and a strap.

11. The pipeline assembly line of claim 1, wherein:
the first eyelet includes a first opening,
the second eyelet includes a second opening overlappable with the first opening,
the first opening merges with a central seat and two lateral seats which are located above the first opening,
the central seat and the two lateral seats are each configured to house the component of the hoisting device, and
the lateral seats are located on opposite sides of the central seat and slope with respect to the central seat such that:
when the component of the hoisting device engages the central seat, the second eyelet is raised with respect to the first eyelet and the safety lock is engaged, and when the component of the hoisting device engages one of the lateral seats, the second eyelet is not raised sufficiently with respect to the first eyelet to engage the safety lock.

12. The pipeline assembly line of claim 1, wherein the first portion defines a recess and the second portion comprises a projection which engages the defined recess to form the safety lock.

13. The pipeline assembly line of claim 12, wherein:
the second portion comprises a frame and a slide with the projection,
the slide is movable with respect to the frame,
the slide is connected to the frame by at least one elastic member to keep the projection detached from the recess, and
the slide is liftable by the hoisting device to engage the projection inside the recess.

14. The pipeline assembly line of claim 1, wherein the second portion comprises a holder configured to house slack of a flexible elongated member of the hoisting device.

15. The pipeline assembly line of claim 1, further comprising a structure configured to integrally connect to the apparatus, the structure being configured to enable the coupling mechanism to be mounted in a quantity of positions with the structure tilted at different angles with respect to the coupling mechanism to keep the designated direction substantially horizontal, regardless of a tilt angle of the pipeline and the apparatus.

16. The pipeline assembly line of claim 1, wherein the apparatus is configured to perform an operation on the pipeline.

17. The pipeline assembly line of claim 1, wherein the first portion is integrally coupled to the apparatus.

18. A underwater pipeline laying vessel comprising:
an assembly line configured to construct a pipeline, said assembly line including:
an apparatus configured to selectively couple to the pipeline;
a hoisting device configured to selectively support the apparatus; and
a connecting device configured to connect the apparatus to the hoisting device, wherein the connecting device includes a coupling mechanism including:
a first portion configured to be coupled to the apparatus;
a second portion comprising at least a first eyelet and a second eyelet selectively movable, crosswise to a designated direction, with respect to each other, the second portion configured to be connected to the hoisting device, wherein the first eyelet and second eyelet are simultaneously engaged by a component of the hoisting device, and said second portion is selectively releasable from the first portion in the designated direction based on: (i) relative positions of the apparatus and the hoisting device, and (ii) a first force exchanged between the apparatus and the hoisting device; and
a safety lock between the first portion and the second portion, said safety lock being selectively activated based on: (i) the relative positions of the apparatus and the hoisting device, and (ii) a second force exchanged between the apparatus and the hoisting device in a direction crosswise to the designated direction, wherein the first eyelet and the second eyelet of the second portion are configured so that movement of the component of the hoisting device in a substantially vertical direction raises the second eyelet with respect to the first eyelet and engages the safety lock.

19. A connecting device configured to connect an apparatus selectively coupleable to a pipeline to a hoisting device configured to support the apparatus, said connecting device comprising:
a coupling mechanism including
a first portion configured to be coupled to the apparatus;
a second portion comprising at least a first eyelet and a second eyelet selectively movable, crosswise to a designated direction, with respect to each other, the second portion configured to be connected to the hoisting device, wherein the first eyelet and second eyelet are simultaneously engaged by a component of the hoisting device, and said second portion is selectively releasable from the first portion in the designated direction based on: (i) relative positions of the apparatus and the hoisting device, and (ii) a first force exchanged between the apparatus and the hoisting device; and
a safety lock between the first portion and the second portion, said safety lock being selectively activated based on: (i) the relative positions of the apparatus and the hoisting device, and (ii) a second force exchanged between the apparatus and the hoisting device in a direction crosswise to the designated direction, wherein the first eyelet and the second eyelet of the second portion are configured so that movement of the component of the hoisting device in a substantially vertical direction raises the second eyelet with respect to the first eyelet and engages the safety lock.

20. A method of supporting an apparatus configured to couple to a pipeline, the method comprising:
connecting the apparatus to a hoisting device via a connecting device having a coupling mechanism which includes a first portion connectable to the apparatus, and a second portion connectable to the hoisting device, the second portion comprising at least a first eyelet and a second eyelet selectively movable, crosswise to a designated direction, with respect to each other, wherein the first eyelet and second eyelet are simultaneously engaged by a component of the hoisting device;
selectively releasing the second portion from the first portion in the designated direction based on: (i) relative positions of the apparatus and the hoisting device, and (ii) a first force exchanged between the apparatus and the hoisting device; and
selectively engaging a safety lock between the first portion and the second portion to prevent relative movement in the designated direction regardless of the first force exchanged between the apparatus and the hoisting device, wherein the safety lock is engaged based on: (i) the relative positions of the apparatus and the hoisting device, and (ii) a third force exchanged between the apparatus and the hoisting device in a direction crosswise to the designated direction and the first eyelet and the second eyelet of the second portion are configured so that movement of the component of the hoisting device in a substantially vertical direction raises the second eyelet with respect to the first eyelet and engages the safety lock.

21. The method of claim 20, further comprising automatically releasing the first portion and the second portions by relative movements between the first portion and the second portion in the designated direction when a component, parallel to the designated direction, of the first force exchanged between the apparatus and the hoisting device exceeds a threshold value.

22. The method of claim 20, further comprising click-on connecting the first portion and the second portion to prevent relative movements between the first portion and the second portion in the designated direction.

23. The method of claim 22, further comprising adjusting a preload of a spring to adjust a strength of the click-on connection.

24. The method of claim 20, further comprising engaging the safety lock via the hoisting device.

25. The method of claim 20, wherein engaging the safety lock comprises inserting at least one projection of the second portion inside at least one recess of the first portion.

* * * * *